Feb. 21, 1961  S. M. WAAS ET AL  2,972,292
CONVERSION UNIT FOR POPCORN MACHINES
Filed Oct. 21, 1957  3 Sheets-Sheet 1

INVENTORS.
Samuel M. Waas
William G. Lippert
BY
ATTORNEY.

Feb. 21, 1961  S. M. WAAS ET AL  2,972,292
CONVERSION UNIT FOR POPCORN MACHINES
Filed Oct. 21, 1957  3 Sheets-Sheet 2

INVENTORS.
Samuel M. Waas
William G. Lippert
BY
ATTORNEY.

Feb. 21, 1961 S. M. WAAS ET AL 2,972,292
CONVERSION UNIT FOR POPCORN MACHINES
Filed Oct. 21, 1957 3 Sheets-Sheet 3

INVENTOR.
Samuel M. Waas
William G. Lippert
BY
ATTORNEY.

United States Patent Office 2,972,292
Patented Feb. 21, 1961

2,972,292
CONVERSION UNIT FOR POPCORN MACHINES

Samuel M. Waas and William G. Lippert, Kansas City, Mo., assignors to Manley, Inc., Kansas City, Mo., a corporation of Missouri Filed Oct. 21, 1957, Ser. No. 691,239

6 Claims. (Cl. 99—238.4)

This invention relates to popcorn machines and, more particularly, to auxiliary apparatus in the nature of an attachment for automatically charging ingredients into the popping kettle thereof.

Popcorn machines of the type wherein the popping kettle is suspended within the cabinet adjacent the uppermost end thereof are well known, and it is the primary object of this invention to provide auxiliary apparatus for converting such machine into an automatic type unit wherein the popcorn, seasoning and salt are directed into the popping kettle in predetermined sequence upon actuation of the apparatus.

A further important object of the invention relates to the provision of conversion apparatus for popcorn machines having structure for receiving the ingredients that is adapted to be mounted within the cabinet adjacent and above the popping kettle so that the ingredients may gravitate into the kettle, thereby obviating any necessity of power operated conduction equipment.

An equally important object of the present invention is to provide conversion apparatus adapted to be mounted on the cabinet so that the same is shiftable to and from an accessible position to thereby facilitate reloading with an additional supply of ingredients.

A further aim of the invention relates to the provision of conduction means on the conversion apparatus for directing the ingredients into the top of the kettle and which is disposed in a position so that the apparatus may be shifted as a unit relative to the kettle to and from a position housed within the cabinet.

An important object of this invention is the provision of rod means attached to the swingable lid of a kettle pivotally suspended within the cabinet and engageable with structure on the cabinet for holding the lid in a substantially horizontal position as the kettle is swung to an ingredient emptying position to thereby prevent the lid from blocking gravitation of the ingredients from the kettle.

Other important objects of the present invention are, (a) to provide structure for converting a manually operated popcorn machine to one which operates automatically for a considerable period of time without operator attention; (b) to include all of the essential components of such structure within a single unit which may be easily, inexpensively and quickly mounted in many differing types of existing machines; (c) to provide a conversion assembly which may be installed and placed in use without necessity of substantial modification of other parts of the machine; (d) to provide a unit which, after installation, will not adversely interfere with use of the machine in the normal manner; (e) to provide a unit that may be mounted in place without need of exceptional skill or expensive labor; (f) to provide a unit that is trouble free in its operation but which may be nonetheless quickly removed for cleaning, repair or replacement when needed; and (g) to permit popcorn popping establishments to convert to automatic operation in an easy and inexpensive manner without need of purchasing expensive automatic equipment or discarding the manual equipment which they have on hand.

In the drawings:

Figs. 5, 6 and 7 are enlarged, cross-sectional views taken on the lines V—V, VI—VI, VII—VII respectively, of Fig. 2.

Figures 1, 8:
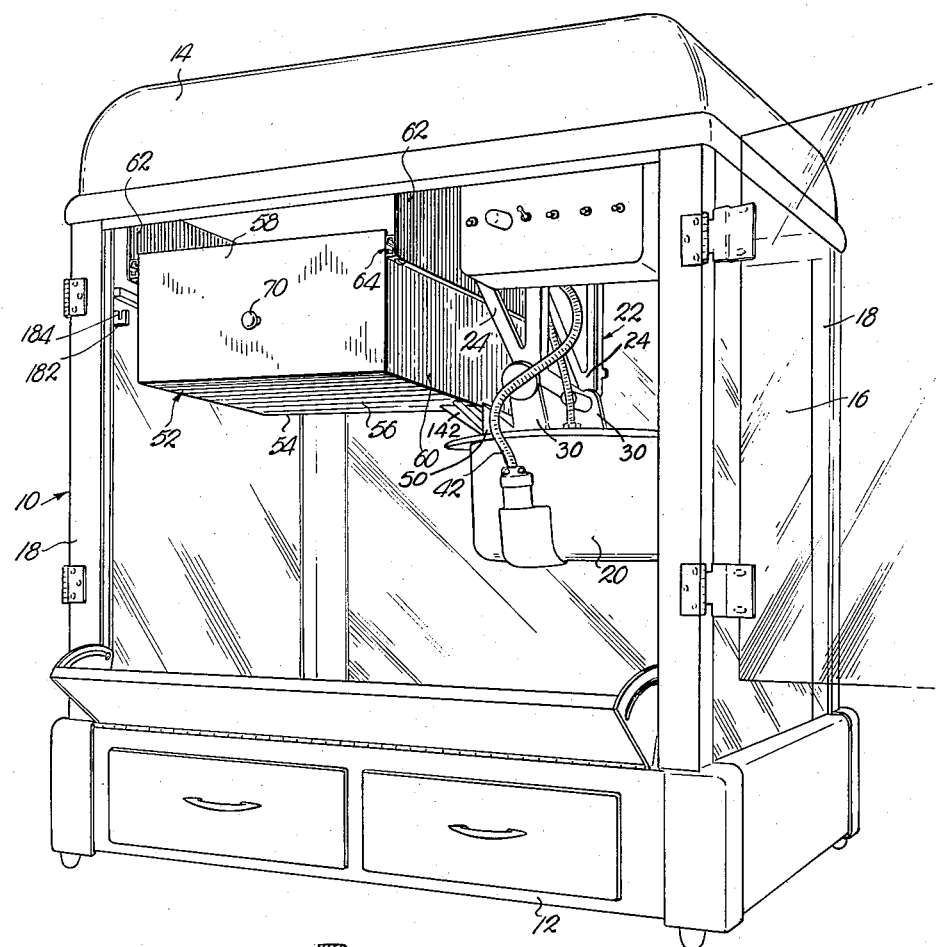
Figure 1 is a perspective view of a popcorn machine illustrating the conversion unit of the instant invention.
Fig. 8 is a cross-sectional view taken on line VIII—VIII of Fig. 6.

A popcorn machine designated generally by the numeral 10 is shown in Fig. 1 of the drawings and includes a base 12, a head 14, and glass side walls 16 supported by pillar construction 18. A conventional popping kettle 20 is located within machine 10 and is pivotally suspended from head 14 by framework broadly designated 22 for vertical swinging movement. (See for example, U.S. Letters Patent 2,232,954 and 2,536,298.)

Figure 2:
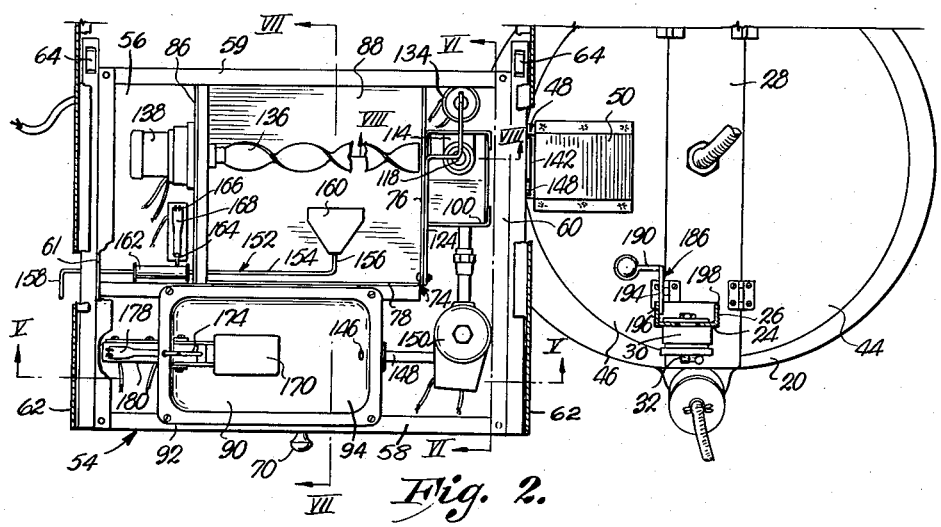
Fig. 2 is an enlarged plan view of the conversion unit partially in section and shown associated with the popping kettle.

Framework 22 includes a pair of upright, substantially Y-shaped frames 24, the lowermost leg 26 of each of the frames 24 being substantially U-shaped in cross-section (Fig. 2).

A substantially rectangular plate 28 is secured to and spans the distance between spaced portions of the uppermost edge of the kettle 20 at the diameter thereof and a pair of spaced, vertical, parallel ears 30 are attached to and extend upwardly from the ends of plate 28. Each of the ears is adjacent the lowermost leg 26 of a corresponding frame 24 and the ears 30 are pivotally connected to the proximal leg 26 by a pivot pin 32 passing through both of the same. An elongated crank arm 34 (Fig. 3) is attached to one end of one of the pivot pins 32 so that upon swinging movement of arm 34, pivot pin 32 is rotated to thereby rotate kettle 20 about the axes of pivot pins 32.

A control rod 36, pivotally connected to arm 34, is driven from a crank on the shaft of a motor (not shown) in hollow head 14. (See U.S. Letters Patent 2,902,920, dated September 8, 1959.)

Kettle 20 is provided with a sectional lid comprising a pair of substantially semicircular members 44 and 46 which are hingedly mounted on opposed, longitudinally extending edges of plate 28. As illustrated in Fig. 2, member 46 has a median rectangular slot 48 extending inwardly from the circular edge thereof, and mounted on the uppermost face of member 46 in covering relationship to slot 48 is a hood 50, the outermost end of hood 50 being open.

A conversion unit for machine 10 is broadly designated by the numeral 52 and comprises an open top drawer 54 including a bottom wall 56, end wall 58, having a pull knob 70, end wall 59, and side walls 60 and 61. (See also Figs. 5–8.)

A pair of rectangular plates 62 are secured to and depend from head 14 adjacent kettle 20, plates 62 being adapted to reciprocably receive drawer 54 by virtue of roller structure 64 provided on drawer 54 and the lower portions of the plates 62, and which permit sliding movement of drawer 54 with respect to plates 62.

Mounted within drawer 54 is an L-shaped panel designated broadly by the numeral 74 having a rectangular leg 76 parallel to side wall 60, and a leg 78 parallel to front wall 58. A pair of downwardly extending and inwardly converging rectangular bottom panels 80 and 82 (Fig. 7) interconnect the innermost face of leg 78 and the innermost face of the back wall 59, panels 80 and 82 merging on a longitudinally extending line 84 which is in closer proximity to the back wall 59 than to leg 78, and spaced from bottom wall 56. A vertical partition 86, legs 76 and 78, a portion of back wall 59, and bottom panels 80 and 82 complete hopper 88. A seasoning hopper 90 (Figs. 5-7), provided with a flange 92 supported by leg 78 and wall 58, has a flat bottom 94 and side and end walls 96 and 98 respectively which converge toward each other as bottom 94 is approached.

A salt hopper 100 is mounted on leg 76 and, as shown in Fig. 6, hopper 100 is polygonal in vertical cross-section so that the lowermost rectangular bottom 102 thereof has a substantially smaller area than the area of the top 104 thereof. This is accomplished by virtue of angularly disposed wall 106 which causes salt in hopper 100 to tend to gravitate toward bottom 102 of the hopper 100. The bottom 102 is provided with an opening (see Fig. 8) receiving an elongated tube 108.

An L-shaped bracket 110 (Fig. 6) is mounted on an end 112 and leg 114 of bracket 110 has an upright bearing 116 secured thereto. An elongated valve rod 118 is reciprocably mounted within bearing 116 and is of sufficient length that the ends thereof extend beyond the upper end 104 of hopper 100 and below the lowermost end of tube 108. Secured to the lower end of rod 118 are a pair of spaced valves 120 and 122 which engage the uppermost and lowermost ends respectively of tube 108. As illustrated in Fig. 8 of the drawings, valves 120 and 122 are spaced apart a distance greater than the length of tube 108 so that valves 120 and 122 alternately engage their respective ends of tube 108. An elongated bar 124 overlying rod 118 is pivotally secured to the outer face of leg 76 and the free end thereof is pivotally attached to the upper end of the vertical core 132 of solenoid valve 134. Spring 130 yieldably biases rod 118 upwardly.

A spiral conveyor 136 is provided within hopper 88 and, viewing Fig. 7, it can be seen that conveyor 136 is preferably disposed in longitudinal alignment with line of intersection 84 and is substantially adjacent thereto. Conveyor 136 is rotatable in suitable bearing means in end 86 and an electrical motor 138 (Fig. 2) provided on the outermost face of end 86 is operably connected with conveyor 136.

A circular opening 140 is provided in leg 76 substantially equal in diameter to the diameter of conveyor 136 and, as shown in Fig. 8, is in substantial alignment with the longitudinal axis of conveyor 136.

An open top chute 142 is secured to the outermost face of leg 76 in partial surrounding relationship to opening 140, and extends at an angle downwardly therefrom through a rectangular opening 144 in bottom wall 56. The lowermost end of chute 142 terminates adjacent hood 50 when drawer 54 is disposed in its innermost position within machine 10, and is located so that ingredients directed into chute 142 gravitate through the opening in hood 50 and through slot 48 into kettle 20. It is also to be noted that the lowermost end of tube 108 is disposed within chute 142 so that salt emanating therefrom gravitates into the open top of chute 142.

The end wall 98 of hopper 90 adjacent leg 76 is provided with an opening 146 (Fig. 2) adjacent bottom 94, and a liquid 148 connected with opening 146 communicates with hopper 90. As illustrated in Fig. 5, the outermost end of conduit 148 terminates adjacent the end of chute 142 so that seasoning directed through conduit 148 from hopper 90 passes through hood 50 and slot 48 into kettle 20. A solenoid operated valve 150 (Figs. 2 and 5) is provided in conduit 148 to control flow of seasoning from hopper 90 through conduit 148.

A substantially Z-shaped rod 152 (Fig. 2) is mounted on drawer 54 with the intermediate stretch 154 thereof passing through end 86 and side wall 61 adjacent the uppermost edges thereof, and it can be seen that the leg 156 of rod 152 is disposed within hopper 88 (Fig. 7) while the end 158 thereof is outside drawer 54. A paddle 160 is mounted on the outermost end of leg 156 and extends downwardly into hopper 88 but is spaced from conveyor 136.

An adjustable set collar 162 (Fig. 2) is secured to stretch 154 of bar 152 between end 86 and the side wall 61, and screw 164 of collar 162 normally extends outwardly therefrom toward motor 138. Mounted on end 86 of hopper 88 is a switch 166 having a swingable switch arm 168 adapted to be engaged by screw 164 upon rotation of bar 152.

A float 170 (Figs. 2, 5 and 7) is secured within hopper 90 by pivot 172, and an irregularly shaped rod 174 attached to float 170 has a U-shaped stretch 176 extending over the uppermost edge of hopper 90, as shown in Fig. 5. The lowermost end of the outer portion of stretch 176 is adapted to engage the swingable arm 178 of a switch 180 which is in turn mounted on leg 78.

An ear 182 (Fig. 1) is attached to the pillar construction 18 adjacent wall 61, and is provided with a vertical slot 184 adapted to slidably receive leg 158 of rod 152.

Figure 3:
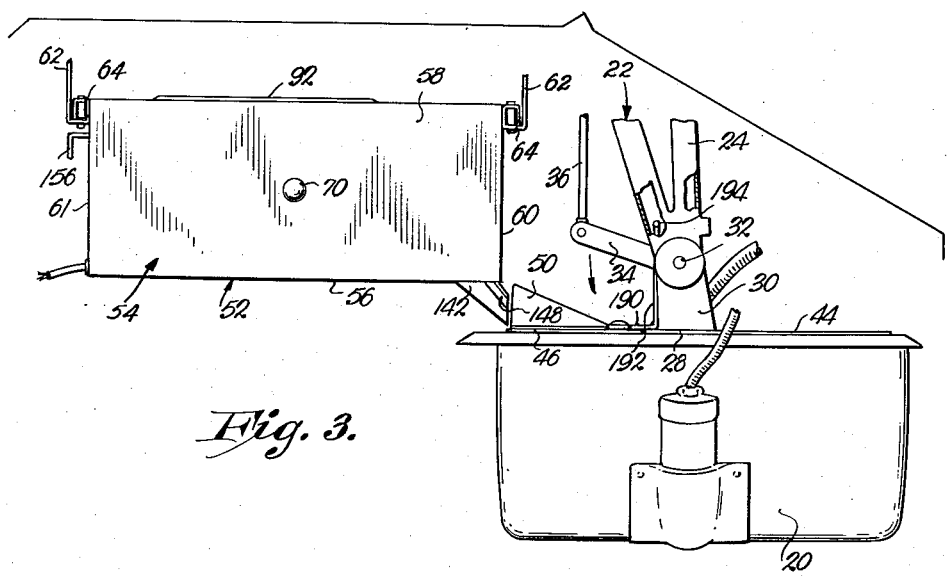
Fig. 3 is an enlarged, fragmentary, front elevational view of the conversion unit and illustrating the position thereof relative to the popping kettle.
Figure 4:
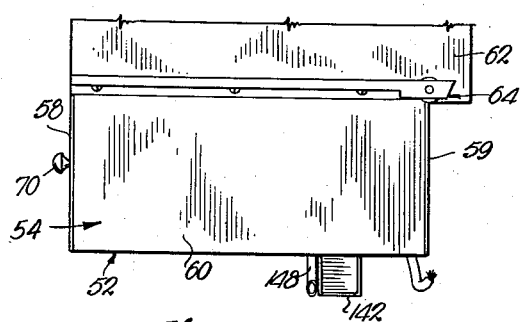
Fig. 4 is a side elevational view of the conversion unit alone.

A substantial Z-shaped rod 186 is attached to member 46 and, as illustrated in Figs. 2 and 3, the same includes a leg 190 parallel with the uppermost face of member 46, an upright stretch 192 that extends upwardly to a position above the proximal ear 30 and a second leg 194 is disposed substantially perpendicularly to stretch 192 and leg 190 in a direction toward the adjacent frame 24. The outermost end of leg 194 is disposed between the outwardly extending flanges 196 and 198 of the lowermost end of U-shaped frame 24 so as to be alternately engageable therewith.

In operation, drawer 54 is initially pulled out of machine 10 until the hoppers 88, 90 and 100 are exposed. With drawer 54 disposed in its extended position without machine 10, ingredients to be dispensed into kettle 20 may be readily placed in the respective hoppers, and it is herein pointed out that hopper 88 is adapted to receive unpopped corn, while hoppers 90 and 100 are especially formed to receive seasoning and salt respectively.

After the hoppers 88, 90 and 100 have been filled to a sufficient height with the various ingredients, drawer 54 is subsequently pushed back into the cabinet in machine 10. With drawer 54 in its innermost position, chute 142 and conduit 148 extend downwardly into register with hood 50 and slot 48.

The electrical components for controlling motor 138 and solenoids 134 and 150 form no part of the instant invention and have, therefore, not been shown. Conventional, cam operated switching means is included to operate such parts, as well as the motor for actuating rod 36, all in proper sequence.

For example, during rotation of the cams, corresponding switches will be closed to energize circuits for motor 138 and solenoids 134 and 150 simultaneously if desired. After the corn is popped another cam will close a switch to cause the kettle 20 to be dumped.

As soon as the supply of corn is exhausted switch 166 will be opened to deenergize the entire electrical hook-up of the machine, or at least the cam operating mechanism, and such inoperation is also effected when switch 180 opens by virtue of emptying of hopper 90.

During each cycle motor 138 will be operated for a predetermined period of time to rotate screw conveyor 136 and thus cause corn to be moved from hopper 88 through opening 140 and into chute 142 where the same gravitates through hood 50 and slot 48 into kettle 20. By the same token, when solenoid 134 is actuated it causes core 132 to be retracted into solenoid 134 and thus pivot rod 124 about pivot means 126 and, consequently, move rod 118 downwardly in hopper 100. Downward movement of rod 118 causes valve 122 to move away from the lowermost end of tube 108, while valve 120 moves into engagement with the uppermost end of tube 108. In this manner, a predetermined quantity of salt, substantially equivalent to the internal volume of tube 108, is dispensed into chute 142. Since solenoid 134 is actuated simultaneously with operation of motor 138, it can be appreciated that salt is directed from hopper 100 into chute 142 substantially at the same time that corn is moved from hopper 88 into chute 142. This simultaneous direction of salt and corn into chute 142 is of importance because of the fact that the corn tends to prevent the salt from adhering to the walls of chute 142 and therefore, direction of all of the salt dispensed from tube 108 into kettle 20 is assured.

Also, solenoid valve 150 is operated simultaneously with actuation of solenoid 134 and operation of motor 138 to permit a predetermined quantity of seasoning to flow from hopper 90 through conduit 148 into kettle 20.

As heretofore pointed out, switches 166 and 180 are opened when arms 168 or 178 have been moved and switch arms 178 or 168 will be closed whenever the stretch 176 or screw 164 respectively are moved into engagement therewith. Such movement of stretch 176 or screw 164 will be effected by movement of the float 170 or paddle 160 respectively downwardly within respective hoppers 90 or 88. Thus, when the level of corn in hopper 88 or seasoning in hopper 90 reaches a predetermined low level, the entire charging cycle of conversion unit 52 will be inactivated and the operator will know that additional ingredients must be placed in unit 52.

It can also be seen that when drawer 54 is moved outwardly from within machine 10, leg 158 of bar 152 engages ear 182 within slot 184 to thereby cause bar 152 to rotate about the longitudinal axis of stretch 154 and consequently move paddle 160 upwardly within hopper 88. In this position, paddle 160 is not buried beneath additional corn placed in hopper 88 and thus, when drawer 54 is shifted back into machine 10, paddle 160 lies upon the uppermost surface of the additional corn placed in hopper 88.

Of further note is the fact that when control rod 36 is reciprocated, crank 34 is swung downwardly to thereby cause kettle 20 to be pivoted about the axis of pins 32 to an ingredient emptying position. As kettle 20 is swung about pins 32, the leg 194 of rod 186 engages the flange 196 of frame 24 to thereby maintain member 46 in a substantially horizontal position during the time kettle 20 is swung to its emptying position. Retention of member 46 in a horizontal position during dumping of kettle 20 is of importance because in such position, member 46 does not interfere with gravitation of the popped corn from kettle 20 and removal of all corn from kettle 20 during each dumping cycle is assured.

As the corn begins to pop and move upwardly within kettle 20, the pressure of the newly popped corn builds up to a point where members 44 and 46 are raised, permitting the corn to overflow kettle 20. Leg 194, striking flange 198, prevents lid 46 from remaining open when kettle 20 returns to the horizontal position.

It is now apparent that conversion unit 52 is adapted to be installed on presently existing equipment since the same may be quickly and easily installed in older types of machines not containing automatic ingredient charging equipment, and also unit 52 may be provided in newly manufactured machines at a relatively low cost.

Having thus described the invention what is claimed as new and desired to be secured by Letters Patent is:

1. In a popcorn machine, a cabinet; a popping kettle swingably suspended in said cabinet; and apparatus entirely separate from said kettle for charging ingredients into the latter, said apparatus including drawer structure having hopper means therein separately receiving the various ingredients and provided with an outlet, said structure being shiftable into and out of the cabinet and being normally disposed in the latter above and to one side of the kettle; mechanism on the structure for automatically measuring designated quantities of the ingredients and delivering the same to said outlet, and conduction means connected with said outlet for directing said quantities of ingredients into the kettle through the top of the latter.

2. In a popcorn machine, a cabinet; a popping kettle swingably suspended in said cabinet; and apparatus entirely separate from said kettle for charging ingredients into the latter, said apparatus including drawer structure having hopper means therein separately receiving the various ingredients and provided with an outlet; roller track assemblies on the structure and the cabinet for shiftably mounting the structure for movement relative to the cabinet, said structure being normally disposed in the cabinet above and to one side of the kettle and being movable to and from a position substantially without the cabinet whereby to render the same accessible to receive the ingredients; mechanism on the structure for measuring designated quantities of the ingredients and delivering the same to said outlet, and conduction means connected with said outlet for gravitationally directing said quantities of ingredients from the outlet into the kettle through the top of the latter.

3. In a popcorn machine, a cabinet; a popping kettle swingably suspended in said cabinet; and apparatus for charging popcorn, seasoning and oil ingredients into said kettle, said apparatus including drawer structure having separate open top hoppers for receiving each of said ingredients, certain parts of each of said hoppers inwardly converging as the lowermost end thereof is approached, said structure being shiftably mounted within the cabinet adjacent to and above said kettle and movable to and from a position without the cabinet to thereby facilitate reloading of the hoppers; mechanism connected to the lowermost end of each of the hoppers for simultaneously permitting designated quantities of the ingredients to gravitate from respective hoppers, and conduction means on the structure and positioned to direct said ingredients gravitating from respective hoppers into the kettle through the top thereof.

4. Apparatus as set forth in claim 3 wherein the hopper for said popcorn ingredient has a pair of downwardly and inwardly converging rectangular bottom walls and opposed end panels, there being an opening in one of the end panels adjacent the intersection of said bottom walls, and a power operated screw conveyor rotatably mounted within the popcorn hopper in longitudinal alignment with the line of intersection between said bottom walls, the axes of the conveyor and the opening being in substantial alignment whereby upon rotation of the conveyor, said quantity of popcorn is delivered through said opening.

5. Apparatus as set forth in claim 4 wherein said conduction means includes a downwardly extending, elongated chute connected to said one end panel and communicating with the popcorn hopper, the outermost end of the chute being positioned over the top of the kettle to gravitationally direct popcorn emanating from said first hopper into the kettle.

6. Apparatus as set forth in claim 5 wherein the lowermost end of the hopper receiving said seasoning is located over said chute in a position whereby seasoning emanating from the seasoning hopper gravitates into the chute and is directed with the popcorn into said kettle.

References Cited in the file of this patent

UNITED STATES PATENTS

| | | |
|---|---|---|
| 680,964 | Day | Aug. 20, 1901 |
| 1,658,486 | Howe | Feb. 7, 1928 |
| 2,134,088 | Obdyke | Oct. 25, 1938 |
| 2,232,954 | Manley | Feb. 25, 1941 |
| 2,538,298 | Manley | Jan. 2, 1951 |
| 2,586,347 | Kloster | Feb. 19, 1952 |
| 2,690,870 | Harman | Oct. 5, 1954 |
| 2,902,920 | Waas | Sept. 8, 1959 |